US012185136B2

(12) United States Patent
Jiang et al.

(10) Patent No.: US 12,185,136 B2
(45) Date of Patent: Dec. 31, 2024

(54) PERFORM NETWORK SPEED TESTS ON A WIRELESS CLIENT DEVICE USING A MASTER DEVICE

(71) Applicant: ARRIS Enterprises LLC, Suwanee, GA (US)

(72) Inventors: Feng Jiang, Shenzhen (CN); Xiangzhong Jiao, Shenzhen (CN); Lijie Niu, Shenzhen (CN); Jinghui Wu, Shenzhen (CN); Jinji Guo, Shenzhen (CN)

(73) Assignee: ARRIS ENTERPRISES LLC, Horsham, PA (US)

( * ) Notice: Subject to any disclaimer, the term of this patent is extended or adjusted under 35 U.S.C. 154(b) by 657 days.

(21) Appl. No.: 17/425,586

(22) PCT Filed: Aug. 3, 2020

(86) PCT No.: PCT/CN2020/106590
§ 371 (c)(1),
(2) Date: Jul. 23, 2021

(87) PCT Pub. No.: WO2022/027183
PCT Pub. Date: Feb. 10, 2022

(65) Prior Publication Data
US 2022/0303797 A1 Sep. 22, 2022

(51) Int. Cl.
*H04W 24/06* (2009.01)
*H04L 41/22* (2022.01)
(Continued)

(52) U.S. Cl.
CPC ............. *H04W 24/06* (2013.01); *H04L 41/22* (2013.01); *H04L 43/0876* (2013.01); *H04L 43/50* (2013.01); *H04L 67/75* (2022.05)

(58) Field of Classification Search
None
See application file for complete search history.

(56) References Cited

U.S. PATENT DOCUMENTS

| 2014/0192792 A1* | 7/2014 | Huang | H04W 76/10 |
| | | | 370/338 |
| 2020/0322826 A1* | 10/2020 | Wangler | H04L 43/50 |
| 2021/0006992 A1* | 1/2021 | Keaton | H04W 24/08 |

FOREIGN PATENT DOCUMENTS

| CN | 105828372 | 8/2016 |
| CN | 107040434 | 8/2017 |
| EP | 3 306 973 | 4/2018 |

OTHER PUBLICATIONS

Totusoft, LAN Speed Test, Mar. 2017 (Year: 2017).*

(Continued)

*Primary Examiner* — Fadi Haj Said
(74) *Attorney, Agent, or Firm* — Wenderoth, Lind & Ponack, L.L.P.

(57) ABSTRACT

A wireless master device to remotely perform network speed tests on a wireless client device that is not in the possession of the user. A user interface (UI) is provided that displays a list of client devices that may be selected to be the wireless master device and a list of client devices that may be selected to perform the speed test. A start instruction is wirelessly sent to start the speed test on the selected client device. Network speed test results of the client device are received by the wireless master device and presented in the UI. The UI presents options for selecting a type of speed test to perform. The UI includes an area where messages and the test results are presented.

20 Claims, 5 Drawing Sheets

(51) Int. Cl.
    *H04L 43/0876*     (2022.01)
    *H04L 43/50*     (2022.01)
    *H04L 67/75*     (2022.01)

(56) References Cited

OTHER PUBLICATIONS

International Search Report and Written Opinion of the International Searching Authority issued May 8, 2021, in International (PCT) Application No. PCT/CN2020/106590.

\* cited by examiner

PERFORM NETWORK SPEED TESTS ON A WIRELESS CLIENT DEVICE USING A MASTER DEVICE

BACKGROUND

The subject matter of the present disclosure relates generally to using a wireless master device to perform network speed tests on a wireless client device that is not in the possession of the user.

Networks have various measures of service quality. Bandwidth, throughput, and latency are typical service quality parameters that can be measured with respect to a particular network. Bandwidth is typically measured in bits per second and represents the maximum rate that data can be transferred across the network from a sender to a receiver. Throughput is typically measured in bits per second and represents the actual rate that data is transferred across the network from the sender to the receiver.

Applications are available that allow a user to test the speed of a network associated with a wireless client device. However, the user must have possession of the wireless client device the user wants to perform a network speed test. The user must individually install an application on each wireless client device the user wants to perform a network. However, devices that are not in possession of the user cannot be tested by the user.

BRIEF SUMMARY OF THE DRAWINGS

The accompanying drawings, which are incorporated in and form a part of the specification, illustrate examples of the subject matter of the present disclosure and, together with the description, serve to explain the principles of the present disclosure. In the drawings.

While implementations are described herein by way of example, those skilled in the art will recognize that the implementations are not limited to the examples or figures described. It is understood that the figures and detailed description thereto are not intended to limit implementations to the particular form disclosed but, on the contrary, the intention is to cover modifications, equivalents, and alternatives falling within the spirit and scope as defined by the appended claims. The headings used herein are for organizational purposes and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to."

DETAILED DESCRIPTION

Aspects of the present invention are directed to running speed tests on client devices. An application is downloaded to client devices and presents a user interface (UI) for controlling the execution of the speed tests. One client device is selected to be a master device. The UI lists client devices that may be selected to perform the speed test. Only one device may perform the speed test at a time. A speed test controller on a network device, such as a router, executes the speed test and communicates with the master device and a selected client device. The master device initiates the speed test on the selected client device. The type of speed test may be a local speed test that tests the speed from the selected client device to a router, a wireless area network (WAN) speed test that tests the speed from the selected client device to the cloud, or both. The results are returned to the master device and presented on the UI.

Figure 1:
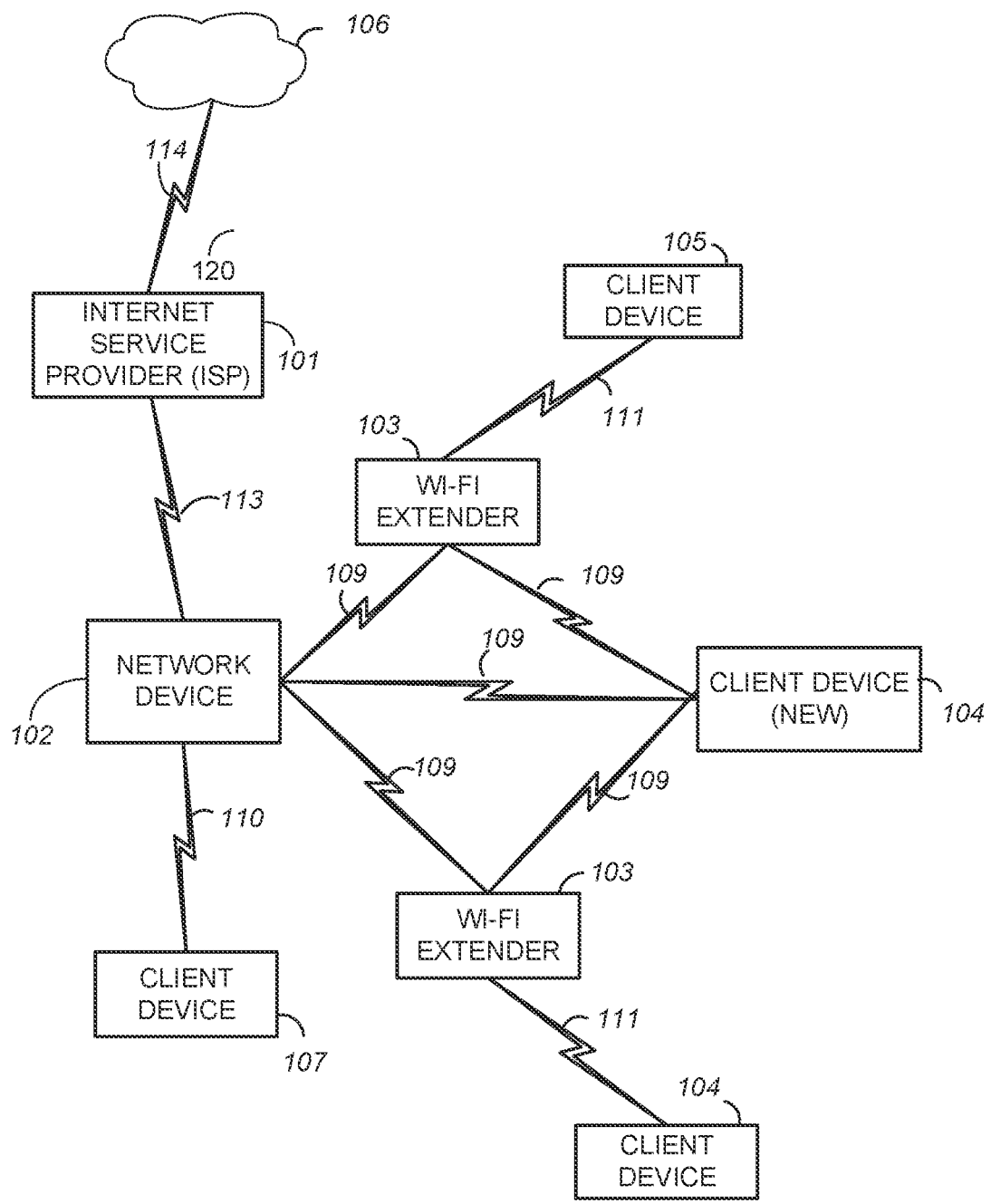
FIG. 1 is a schematic diagram of a system.

FIG. 1 is a schematic diagram of a system.

As shown in FIG. 1, the elements of the system include a network device 102 connected to the Internet 106 via an Internet Service Provider (ISP) 101 and also connected to different wireless devices such as wireless extenders 103 and wireless client devices 104, 105, 107. The system shown in FIG. 1 includes wireless devices (e.g., wireless extenders 103 and wireless client devices 104, 105, 107) that may be connected in one or more wireless networks (e.g., private, guest, iControl, backhaul network, or Internet of things (IoT) network) within the system. Additionally, there could be some overlap between wireless devices (e.g., wireless extenders 103 and wireless client devices 104, 105, 107) in the different networks. That is, one or more network devices could be located in more than one network. For example, the wireless extenders 103 could be located both in a private network for providing content and information to wireless client devices 104, 105, 107 and also included in a backhaul network or an iControl network.

Starting from the top of FIG. 1, the ISP 101 can be, for example, a streaming video provider or any computer for connecting the network device 102 to the Internet 106. The connection 114 between the Internet 106 and the ISP 101 and the connection 113 between the ISP 101 and the network device 102 can be implemented using a wide area network (WAN), a virtual private network (VPN), metropolitan area networks (MANs), system area networks (SANs), a DOCSIS (Data Over Cable Service Interface Specification) network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example.

The connection 113 can further include as some portion thereof a broadband mobile phone network connection, an optical network connection, or other similar connections. For example, the connection 113 can also be implemented using a fixed wireless connection that operates in accordance with, but is not limited to, 3rd Generation Partnership Project (3GPP) Long Term Evolution (LTE) or 5G protocols. It is also contemplated by the present disclosure that connection 113 is capable of providing connections between the network device 102 and a WAN, a LAN, a VPN, MANs, personal area networks (PANs), wireless LANs (WLANs), SANs, a DOCSIS network, a fiber optics network (e.g., FTTH, FTTX, or HFC), a PSDN, a global Telex network, or a 2G, 3G, 4G or 5G network, for example.

The network device 102 can be, for example, a hardware electronic device that may be a combination modem and gateway device that combines the functions of a modem, an access point, and/or a router for providing content received from the content provider 101 to network devices (e.g., wireless extenders 103 and wireless client devices 104, 105, 107) in the system. It is also contemplated by the present disclosure that the network device 102 can include the function of, but is not limited to, an Internet Protocol/

Quadrature Amplitude Modulator (IP/QAM) set-top box (STB) or smart media device (SMD) that is capable of decoding audio/video content, and playing over-the-top (OTT) or multiple system operator (MSO) provided content.

The connection 109 between the network device 102, the wireless extenders 103, and wireless client devices 104, 105, 107 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, or 6 GHz bands. Additionally, the connection 109 can be implemented using a wireless connection that operates in accordance with, but is not limited to, Radio Frequency for Consumer Electronics (RF4CE) protocol, ZigBee protocol, Z-Wave protocol, or IEEE 802.15.4 protocol. It is also contemplated by the present disclosure that the connection 109 can include connections to a media over coax (MoCA) network. One or more of the connections 109 can also be a wired Ethernet connection.

The wireless extenders 103 can be, for example, hardware electronic devices such as access points used to extend the wireless network by receiving the signals transmitted by the network device 102 and rebroadcasting the signals to, for example, wireless client devices 104, 105, 107, which may out of range of the network device 102. The wireless extenders 103 can also receive signals from the wireless client devices 104, 105, 107, and rebroadcast the signals to the network device 102, or other wireless client devices 104, 105, 107.

The connection 111 between the wireless extenders 103 and the wireless client devices 104, 105, 107 are implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands. Additionally, the connection 111 can be implemented using a wireless connection that operates in accordance with, but is not limited to, RF4CE protocol, ZigBee protocol, Z-Wave protocol, or IEEE 802.15.4 protocol. Also, one or more of the connections 111 can be a wired Ethernet connection.

The wireless client devices 104, 105, 107 can be, for example, hand-held computing devices, personal computers, electronic tablets, smart phones, smart speakers, IoT devices, iControl devices, portable music players with smart capabilities capable of connecting to the Internet, cellular networks, and interconnecting with other devices via Wi-Fi and Bluetooth, or other wireless hand-held consumer electronic devices capable of executing and displaying content received through the network device 102. Additionally, the wireless client devices 104, 105, 107, can be a TV, an IP/QAM STB or an SMD that is capable of decoding audio/video content, and playing over over-the-top (OTT) or MSO provided content received through the network device 102.

The connection 110 between the network device 102 and the wireless client devices 104, 105, 107, is implemented through a wireless connection that operates in accordance with, but is not limited to, any IEEE 802.11 protocols. Additionally, the connection 110 between the network device 102 and the wireless client devices 104, 105, 107 may also be implemented through a WAN, a local area network (LAN), a VPN, MANs, PANs, WLANs, SANs, a DOCSIS network, a fiber optics network (e.g., FTTH, FTTX, or HFC), a PSDN, a global Telex network, or a 2G, 3G, 4G or 5G network, for example.

The connection 110 can also be implemented using a wireless connection in accordance with Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, or 6 GHz bands. One or more of the connections 110 can also be a wired Ethernet connection.

One client device may initiate a network speed test on another client device. For example, wireless client device 107 may initiate a network speed test on wireless client device 105. However, the user of wireless client device 107 may not have possession of wireless client device 105. For example, wireless client device 105 may belong to the user's spouse, children, friend, etc., and wireless client device 105 may be located in a different room (e.g., the den) than wireless client device is located (e.g., a bedroom). The users of wireless client devices 104, 105, 107 may download and install a network speed test application. Wireless client device 107 may initiate a network speed test on wireless client device 105. However, the user of wireless client device 107 may not have possession of wireless client device 105. For example, wireless client device 105 may belong to the user's spouse, children, friend, etc., and wireless client device 105 may be located in a different room (e.g., the den) than wireless client device 107 is located (e.g., a bedroom).

The users of client devices 104, 105, 107 may download and install a network speed test application. The user of wireless client device 107 may open the network speed test application on wireless client device 107. The network speed test application on client device 107 may be used to set wireless client device 107 as a wireless master device. A network speed test icon is displayed on the wireless master device 107 and may be selected to open network speed test application on wireless master device 107. A speed test user interface is then displayed. The speed test user interface (UI) presents a list of wireless client devices 104, 105 to test. From the speed test UI, a type of speed test is selected. From the list of wireless client devices 104, 105 displayed in the UI, wireless client devices 105 may be selected to perform the speed test. While a plurality of wireless client device 104, 105 may be selected, only one wireless client device may perform the network speed test at a time. The user selects start on wireless master device 107 and a verification messages is sent to the selected wireless client device 105. The user of wireless master device 107 may select to perform on wireless client device 105 a local LAN speed test, a WAN speed test, or both. A speed test server on a network device 102 starts and a message is sent to wireless client device 105 that the network speed test is running. After completion of the network speed test, wireless client device 105 sends speed test results to wireless master device 107.

Figure 2:
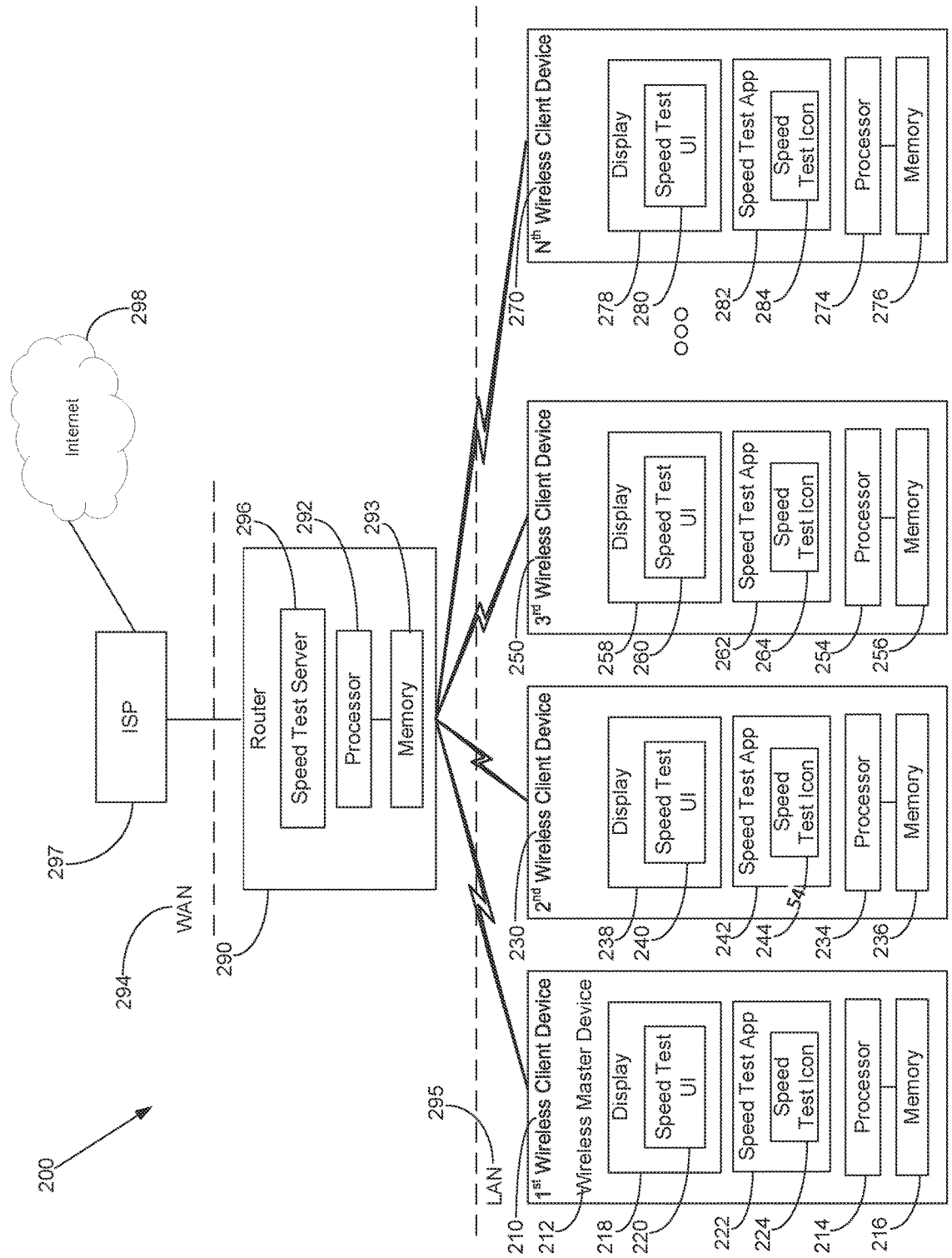
FIG. 2 illustrates a system configured to perform a network speed test on a remote wireless client device.

A detailed description of the exemplary internal components of the network device 102, the wireless extenders 103, and the wireless client devices 104, 105, 107 shown in FIG. 1 will be provided in the discussion of FIG. 2. However, in general, it is contemplated by the present disclosure that the network device 102, the wireless extenders 103, and the wireless client devices 104, 105, 107 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing components in the network device 102, the wireless extenders 103, and the wireless client devices 104, 105, 107 may be adapted to execute any operating system, including Linux, UNIX, Windows, MacOS, DOS, and ChromOS as well as virtual machines adapted to virtualize execution of a particular operating system, including customized and proprietary operating systems. The network device 102, the wireless extenders 103, and the wireless client devices 104, 105, 107 are further equipped with components to facilitate communication with other computing devices over the one or more network connections to local and wide area networks, wireless and wired networks, public and private networks, and any other communication network enabling communication in the system.

FIG. 2 illustrates a system 200 configured to perform a network speed test on a remote wireless client device.

In FIG. 2, a first wireless client device 210 is configured as a master device 212. The master device 212 includes a display 218 for presenting a speed test user interface 220. A speed test application 222 has been installed on master mobile device 212. A speed test icon 224 may be presented on the display 218 by speed test application 222. The user may select the speed test icon 224 on the display 218 to initiate the speed test application 222. Wireless client devices 230, 250, 270 also include displays 218, 258, 278 for presenting a speed test user interface 224, 260, 280, respectively. As shown in FIG. 2, wireless client devices 230, 250, 270 have installed speed test applications 242, 262, 282, respectively. One or more of wireless client devices 230, 250, 270 must have the speed test application installed to perform a speed test. As shown in FIG. 2, $1^{st}$ wireless client device 210, $2^{nd}$ wireless client device 230, $3^{rd}$ wireless client device 250 and $N^{th}$ wireless client device 270 have installed speed test applications 222, 242, 262, 282, respectively, and present speed test icons 224, 244, 264, 284, respectively. Also, $1^{st}$ wireless client device 210, $2^{nd}$ wireless client device 230, $3^{rd}$ wireless client device 250 and $N^{th}$ wireless client device 270 each include a display 218, 238, 258, 278, respectively. Each display 218, 238, 258, 278 present the speed test user interface 220, 240, 260, 280. Thus, any user of a wireless client device having the speed test application installed may perform a network speed test. Further, each wireless client device 210, 230, 250, 270 also include respective processors 214, 234, 254, 274 as well as respective memory 216, 236, 256, 276.

Wireless master device 212 is coupled to router 290. Router 290 includes a processor 292 and memory 293. Router 290 also includes a speed test server 296 that is capable of performing network speed tests on, for example, $2^d$ wireless client device 230, $3^{rd}$ wireless client device 250, $N^{th}$ wireless client device 270. Wireless master device 212 is also coupled to router 290. Using the speed test UI 220, wireless master device 212 may select speed test icon 224 of speed test application 222 to cause the speed test server 296 on router 290 to initiate a network speed test on $2^{nd}$ wireless client device 230, $3^{rd}$ wireless client device 250, or $N^{th}$ wireless client device 270. Only one of $2^{nd}$ wireless client device 230, $3^{rd}$ wireless client device 250, $N^{th}$ wireless client device 270 perform a network speed test at any given time. Router 290 provides a connection with ISP 297 so that devices may access the Internet 298. The ISP 297 is on the wide area network (WAN) side 294 of router 290, while client devices 1-N are on the LAN side of router 290.

Typically, if a user of $1^{st}$ wireless client device 210 selects to initiate a network speed test on $2^{nd}$ wireless client device 230, $3^{rd}$ wireless client device 250, or $N^{th}$ wireless client device 270, the user had to obtain possession of $2^{nd}$ wireless client device 230, $3^{rd}$ wireless client device 250, or $N^{th}$ wireless client device 270 before running a network speed test.

According to the subject matter of the present disclosure is described herein, $1^{st}$ wireless client device 210 may download network speed test application 222. The application allows $1^{st}$ wireless client device 210 to designate $1^{st}$ wireless client device 210 as a wireless master device 212. The wireless master device 212 controls selections of devices, e.g., $2^{nd}$ wireless client device 230, $3^{rd}$ wireless client device 250, $N^{th}$ wireless client device 270, to determine which wireless client device 230, 250, 270 will perform the network speed test. The network speed test is performed on only one of $2^{nd}$ wireless client device 230, $3^{rd}$ wireless client device 250, $N^{th}$ wireless client device 270 at a time. While speed test UI may show all wireless client devices, i.e., $2^{nd}$ wireless client device 230, $3^{rd}$ wireless client device 250, $N^{th}$ wireless client device 270, only one wireless client device is selected at a time. After a first client device, e.g., $2^{nd}$ wireless client device 230, completes a network speed test, a different wireless client device, e.g., $N^{th}$ wireless client device 270, may be selected to run a network speed test. Each wireless client device that is associated with running a network speed test, i.e., wireless master device 212, $2^{nd}$ wireless client device 230, $3^{rd}$ wireless client device 250, and $N^{th}$ wireless client device 270, must install the speed test application 222, 242, 262, 282.

The setting of a particular wireless client device as wireless master device 212 may be changed through the speed test application 222, 242, 262, 282. Any wireless client device 210, 230, 250, 270 that has installed the speed test application 222, 242, 262, 282 may be selected to be a wireless master device 212. However, there can be only one wireless master device 212 at any time. Only the wireless client device (e.g., $1^{st}$ wireless client device 210 in FIG. 2) that is selected to be the wireless master device 212 may start a network speed test for other users.

As mentioned earlier, the wireless master device 212 is also used to select the type of network speed test to perform. The wireless master device may be used to select to perform: (1) a local speed test ranging from the selected wireless client device to router 290; (2) WAN side speed test that ranges from the wireless client device to the cloud, i.e., the Internet; or (3) both a local speed test and a WAN side speed test.

Once the speed test icon is selected, the wireless master device 212 sends a message to the selected wireless client device, e.g., $2^{nd}$ wireless client device 230. Then, the speed test application 242 on $2^{nd}$ wireless client device 230 is activated to display the speed test UI 240 and display 238. Then display 238 queries 2" wireless client device 230 whether $2^{nd}$ wireless client device 230 accepts execution of a network speed test thereon. The application 242 may also present a message on the speed test UI 240 indicating that the Wi-Fi of $2^{nd}$ wireless client device 230 may be affected for 1-2 minutes. If the user selects "NO" on speed test UI 240, the network speed test is terminated, and a notification is displayed on speed test UI 220 of wireless master device 212. Wireless master device 212 may decide to run the network speed test at another time. However, if the user selects "YES" on speed test UI 240, router 290 receives a reply message from $2^{nd}$ wireless client device 230 and the router 290 forwards this message to wireless master device 212 so that the wireless master device 212 knows that the network speed test is being performed by $2^{nd}$ wireless client device 230. When the wireless master device 212 selects to perform a network speed test on the LAN side 295, then the router 290 initiates built-in speed test server 296 and sends a message to $2^{nd}$ wireless client device 230 to indicated that the speed test server 296 is ready and that the network speed test is about to begin. Once the network speed test for $2^{nd}$ wireless client device 230 has completed, the results are sent to the wireless master device 212.

When the wireless master device 212 selects to perform a network speed test for the WAN side 294, $2^{nd}$ wireless client device 230 initiates the network speed test for the WAN side 294. When the network speed test for the WAN side 294 has completed, the results are sent to the wireless master device 212. When the wireless master device 212 selects to perform a network speed test for both the LAN side 295 and the WAN side 294, the network speed tests are executed, and the results are sent to the wireless master device 212.

The user of the wireless master device or $2^{nd}$ wireless client device 230 may cancel the test during the performance of the network speed test. Wireless master device 212 is informed of the cancellation with a message indicated that the network speed test failed. A notification may also be displayed on speed test UI 220 of wireless master device 212 querying the wireless master device 212 whether the network speed test for $2^{nd}$ wireless client device 230 should be attempted again.

If the wireless master device 212 does not receive results in a predetermined time period, e.g., 3 minutes, a notification may also be displayed on speed test UI 220 of wireless master device 212 querying the wireless master device 212 whether the network speed test for $2^{nd}$ wireless client device 230 should be attempted again. When the results are received by the wireless master device 212, a decision may be made whether to repeat the network speed test. The network speed test may also timeout, e.g., after no response being given within 1 minute. The speed test UI 220 of wireless master device 212 may then indicate that the network speed test failed and queries the user of wireless master device 212 whether another attempt is to be made to execute the network speed test on $2^{nd}$ wireless client device 230.

Figure 3:
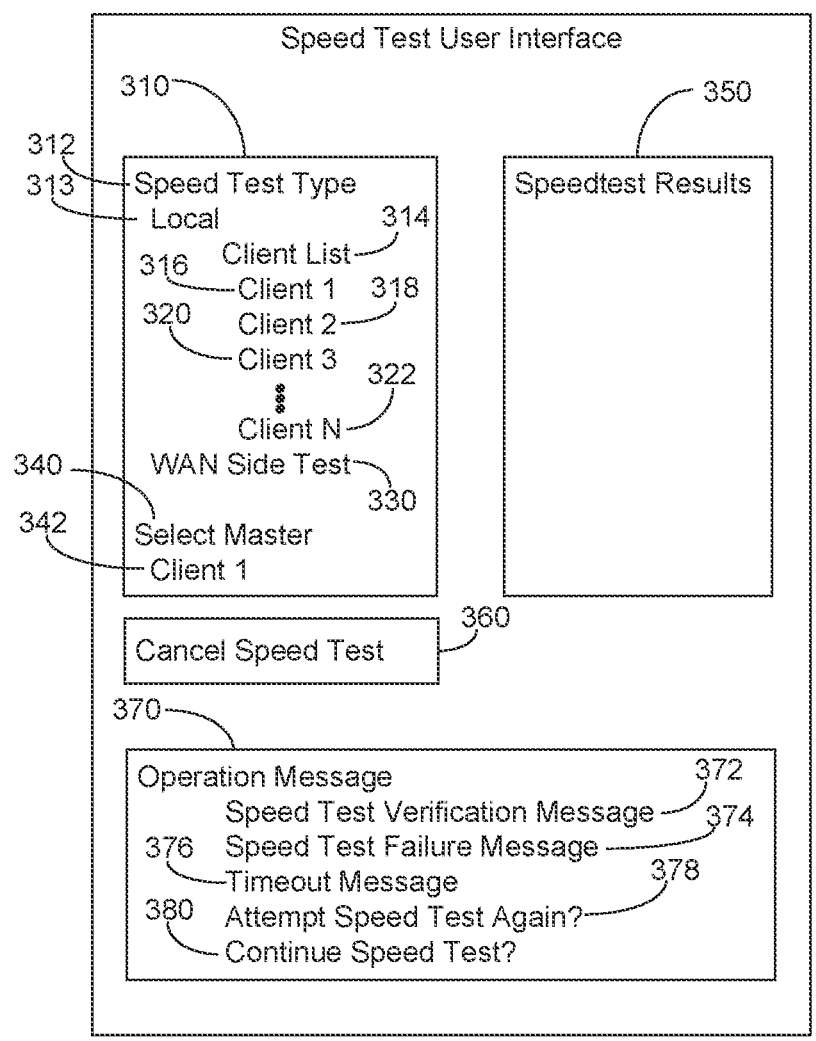
FIG. 3 is an illustration of a network speed test user interface.

FIG. 3 is an illustration of a speed test user interface 300.

In FIG. 3, the speed test user interface 300 includes a first interface 310 for selecting the type of network speed test 312 and which wireless client device will be selected as the wireless master device 340. The speed test type 312 may be a local speed test 313. A list of devices 314 is present indicating wireless client devices that may perform a network speed test. The user may select one or more wireless client devices, e.g., client 1 316, client 2 318, client 3 320, or client N 322. However, a network speed test may be performed on only one wireless client device at a time. The speed test type 312 may be also include a WAN speed test 330.

A results interface 350 is provided to display the results from a network speed test. For example, once the network speed test for a wireless client device has completed, the results are sent to the wireless master device where they may be displayed in the results interface 350 of the speed test user interface 300. The results interface 350 may also display a notification may also be displayed in the results interface 350 of the speed test user interface 300. The notification displayed in the results interface 350 may provide a query to the wireless master device whether the network speed test for wireless client device should be attempted again when the wireless master device does not receive results in a predetermined time period.

A cancellation interface presents a button 360 that may be selected to cancel execution of a network speed test. The user of the wireless master device may cancel the test during the performance of the network speed test using cancellation button 360. The wireless master device is informed of the cancellation with a message indicated that the network speed test failed. The message may be displayed in messaging interface 370. Messaging interface 370 is presented to display operation messages. For example, messaging interface 370 may include a speed test verification message 372, a speed test failure message 374, a timeout message 376, a query whether to attempt to perform the network speed test again 378, a query whether the network speed test should be continued 380.

Figure 4A:
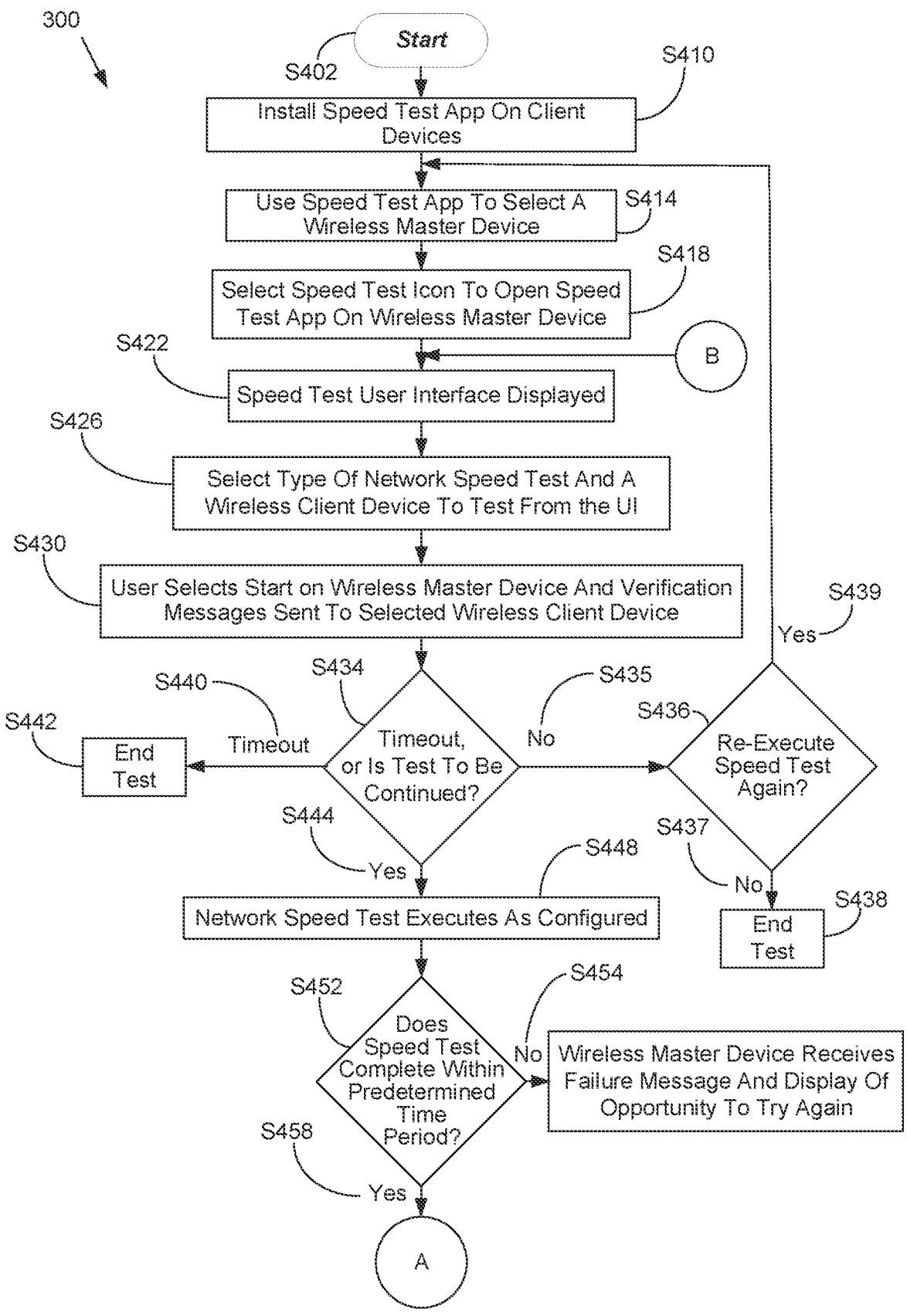
FIGS. 4a-4b illustrate a flow chart showing execution by a master device of a network speed test on a wireless client device that is not in the possession of the user.
Figure 4B:
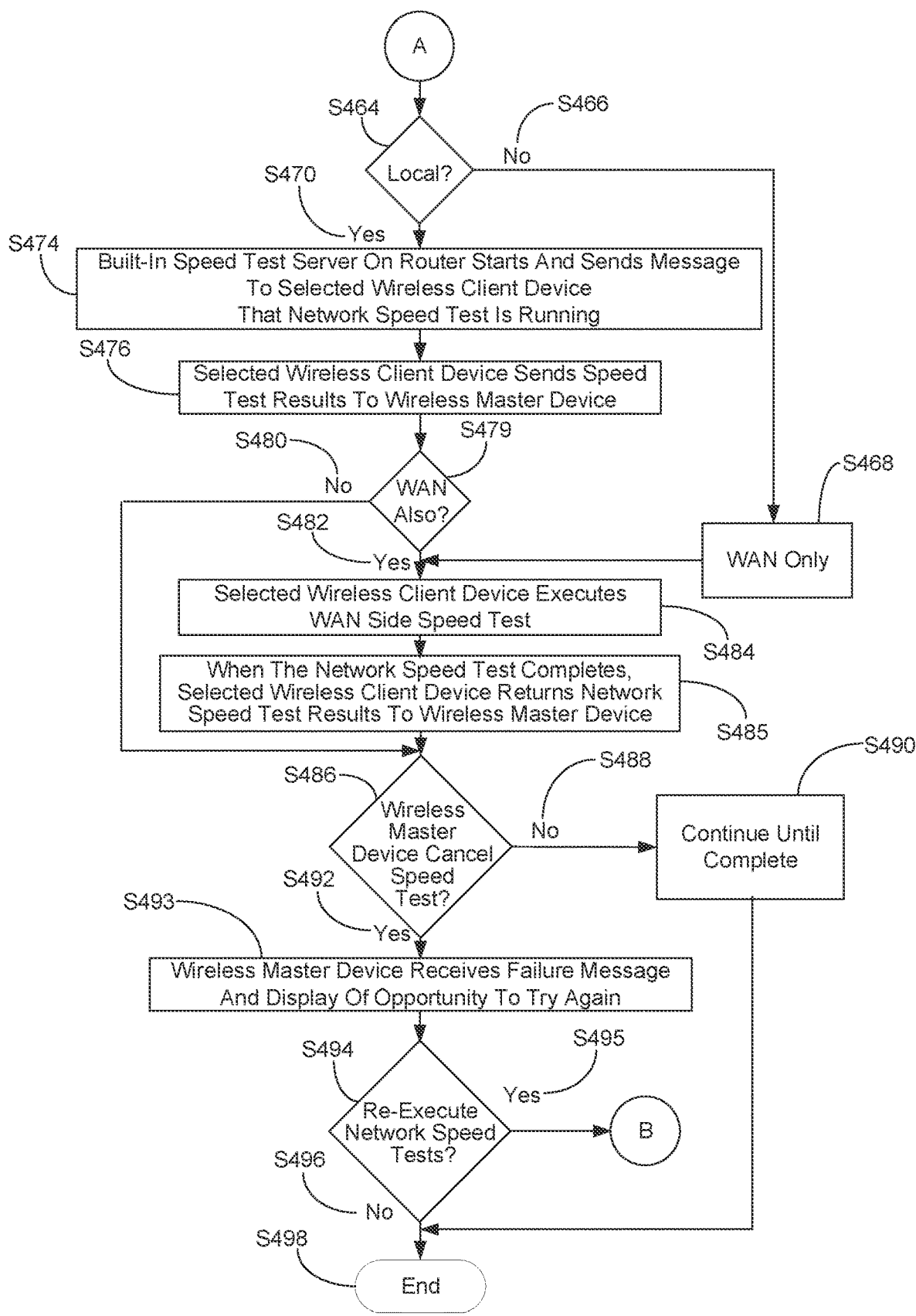

FIGS. 4a-4b illustrate a flow chart 700 showing execution by a master device of a network speed test on a wireless client device that is not in the possession of the user.

In FIG. 4a, method 400 starts (S402), and a speed test application is installed on wireless client devices (S410). A speed test application is used to select a wireless master device (S414). The speed test icon is selected to open the speed test application on wireless master device (S418). A speed test UI is then displayed (S422). A selection of a type of network speed test and a wireless client device to test from the UI (S426). The user selects start on wireless master device and verification messages are sent to the selected wireless client device (S430).

A determination is then made whether a timeout occurs, or whether testing is to be continued (S434). When the network speed test is not to be continued (S435), a query is displayed asking if the network speed test is to be re-executed again (S436). If the network speed test is not to be re-executed again (S437), the network speed test is terminated (S438). If the network speed test is to be re-executed again (S439), the process returns to (S414). When a timeout occurs (S440), the network speed test is terminated (S442). If test is to be continued (S444), the network speed test executes as configured (S448).

A determination is made whether network speed test completed within predetermined time period (S452). If the process does not complete within the predetermined time period (S454), the wireless master device receives a failure message and displays of opportunity to repeat the network speed test again (S456). If the process completes within the predetermined time period (S458), the process proceeds to "A" in FIG. 4b.

In FIG. 4b, a determination is then made whether the network speed test is performed on the LAN side (S464). If the network speed test is not configured to be performed on the LAN side (S466), only the WAN speed test is performed (S468). If the network speed test is performed on the LAN side (S470), the built-in speed test server on router starts and a message is sent to the selected wireless client device that the network speed test is running (S474). The selected wireless client device sends speed test results to wireless master device (S476). A determination is made whether the network speed test is performed on the WAN side also (S479). If the WAN speed test is not to be performed (S480), the process skips the WAN side speed test and proceeds to (S486). If the WAN speed test is to be performed (S482), the selected wireless client device executes the WAN side speed test (S484). When the network speed test completes, the selected wireless client device returns network speed test results to wireless master device (S485).

A determination is made whether the master device cancels the network speed test (S486). If the network speed test is not canceled by the master device (S488), the network speed test is continued until completed (S490). If the network speed test is canceled by the master device (S492), the wireless master device receives a failure message and displays an opportunity to try again if the network speed test is canceled by the master device (S493).

A determination is then made whether the network speed test is to be re-executed (S494). If the network speed test is to be re-executed (S495), the process returns to "B" in FIG. 4a. If the network speed test is not to be re-executed (S496), the process ends (S498).

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

The subject matter of the present disclosure may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, or the like. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, the subject matter of the present disclosure may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A wireless master device comprising: a memory; and a processor configured to execute instructions stored on the memory to cause the wireless master device to:
install a speed test application on the wireless master device;
identify a wireless client device of one or more client devices to perform a speed test using a user interface presented by the speed test application on a display of the wireless master device;
wirelessly send a message to activate the speed test on the identified wireless client device;
receive a reply message from a router connected to the wireless master device, wherein the reply message indicates that the speed test is being performed by the identified wireless client device;
determine whether the speed test completed within a predetermined time period; and
receiving speed test results of the identified wireless client device based on the determination, wherein the speed test results comprise one or more of a speed test verification message, a speed test failure message, a timeout message, a query whether to attempt to perform the speed test again, and a query whether the speed test should be continued.

2. The wireless master device of claim 1, wherein the processor is further configured to execute the instructions stored on the memory to cause the wireless master device to activate the speed test application by selecting an icon to open the speed test application and to display the user interface.

3. The wireless master device of claim 2, wherein the processor is further configured to execute the instructions stored on the memory to cause the wireless master device to display, on the user interface of the wireless master device, a speed test type selection interface including a list of the one or more wireless client devices to identify the wireless client device to perform the speed test, a master selection interface to set the wireless master device, an operation message and the speed test results.

4. The wireless master device of claim 2, wherein the processor is further configured to execute the instructions stored on the memory to cause the wireless master device to select using the user interface a type of speed test to perform.

5. The wireless master device of claim 1, wherein the processor is further configured to execute the instructions stored on the memory to cause the wireless master device to activate the speed test on the identified wireless client device by:
selecting start on the speed test application on the wireless master device;
selecting to execute the speed test as configured in the user interface on the wireless master device; and
causing the speed test to begin on a speed test server coupled to the identified wireless client device.

6. The wireless master device of claim 1, wherein the processor is further configured to execute the instructions stored on the memory to cause the wireless master device to perform the speed test on the identified wireless client device from the one or more client devices provided by the speed test application by:
- selecting to perform a local speed test on the identified wireless client device;
- selecting to perform a WAN speed test using the identified wireless client device; or
- selecting to perform both the local speed test on the identified wireless client device and the WAN speed test using the identified wireless client device.

7. The wireless master device of claim 1, wherein the processor is further configured to execute the instructions stored on the memory to cause the wireless master device to receive, on the user interface implemented by the speed test application on the wireless master device, a command to cancel the speed test.

8. The wireless master device of claim 1, wherein the processor is further configured to execute the instructions stored on the memory to cause the wireless master device to receive, on the user interface implemented by the speed test application on the wireless master device, a command to re-execute the speed test.

9. A method of a wireless master device for performing a speed test, comprising:
- installing a speed test application on the wireless master device;
- identifying at least one wireless client device of the plurality of wireless client devices to perform a speed test using a user interface presented by the speed test application on a display of the wireless master device;
- wirelessly sending a message, to the identified at least one wireless client device, to activate the speed test on the identified at least one wireless client device;
- receiving a reply message from a router connected to the wireless master device, wherein the reply message indicates that the speed test is being performed by the identified wireless client device;
- determining whether the speed test completed within a predetermined time period; and
- receiving speed test results of the identified wireless client device based on the determination, wherein the speed test results comprise one or more of a speed test verification message, a speed test failure message, a timeout message, a query whether to attempt to perform the speed test again, and a query whether the speed test should be continued.

10. The method of claim 9, wherein the activating the speed test application comprises selecting, on the wireless master device, an icon to open the speed test application and displaying the user interface.

11. The method of claim 10, wherein the displaying the user interface comprises displaying a speed test type selection interface including a list of the plurality of wireless client devices to select a second wireless client device to perform the speed test, displaying a master selection interface to set the wireless master device, displaying an operation message and displaying the speed test results.

12. The method of claim 10, wherein the displaying the user interface further comprises displaying a type of speed test to perform, a first command to cancel the speed test and a second command to re-execute the speed test.

13. The method of claim 11, wherein the performing the speed test on the second wireless client device further comprises:
- selecting start on the speed test application on the wireless master device;
- selecting to execute the speed test as configured in the user interface on the wireless master device; and
- causing a speed test server to start the speed test on the second wireless client device.

14. The method of claim 11, wherein the selecting the second wireless client device to perform the speed test from the list provided by the speed test application further comprises:
- selecting to perform a local speed test on the second wireless client device;
- selecting to perform a WAN speed test using the second wireless client device; or
- selecting to perform both the local speed test on the second wireless client device and the WAN speed test using the second wireless client device.

15. A non-transitory, computer-readable media having computer-readable instructions stored thereon, the computer-readable instructions being capable of being read by a wireless master device, wherein the computer-readable instructions are capable of instructing the wireless master device to perform a method comprising:
- installing a speed test application on the wireless master device;
- identifying at least one wireless client device of a plurality of wireless client devices to perform a speed test using a user interface presented by the speed test application on a display of the wireless master device;
- wirelessly sending a message, to the at least one wireless client device, to activate the speed test on the identified at least one wireless client device;
- receiving a reply message from a router connected to the wireless master device, wherein the reply message indicates that the speed test is being performed by the identified wireless client device;
- determining whether the speed test completed within a predetermined time period; and
- receiving speed test results of the identified at least one wireless client device based on the determination, wherein the speed test results comprise one or more of a speed test verification message, a speed test failure message, a timeout message, a query whether to attempt to perform the speed test again, and a query whether the speed test should be continued.

16. The non-transitory, tangible, computer-readable media of claim 15,
wherein the computer readable instructions are executable by instructing the wireless master device to perform the method wherein the activating the speed test comprises selecting on the wireless master device an icon to open the speed test application and displaying the user interface.

17. The non-transitory, tangible, computer-readable media of claim 16, wherein the computer readable instructions are executable by instructing the wireless master device to perform the method wherein the displaying the user interface comprises displaying on the wireless master device a speed test type selection interface including a list of the plurality of wireless client devices to select a second wireless client device to perform the speed test, displaying a master selection interface to set a first wireless client device of the plurality of wireless client devices as the wireless master device, displaying an operation message, and displaying the speed test results.

18. The non-transitory, tangible, computer-readable media of claim 16,
wherein the computer readable instructions are executable by instructing the wireless master device to perform the method wherein the displaying, on the wireless master device, the user interface further comprises displaying a type of speed test to perform, a first command to cancel the speed test and a second command to re-execute the speed test.

19. The non-transitory, tangible, computer-readable media of claim 15, wherein the computer readable instructions are executable by instructing the wireless master device to perform the method wherein the activating the speed test on the identified at least one wireless client device further comprises:
   selecting start on the speed test application on the wireless master device;
   selecting to execute the speed test as configured in the user interface on the wireless master device, and
   causing a speed test server to start the speed test on the identified at least one wireless client device.

20. The non-transitory, tangible, computer-readable media of claim 15, wherein the computer readable instructions are executable by instructing the wireless master device to perform the method wherein the identifying at least one wireless client device to perform the speed test from the plurality of the wireless client devices provided by the speed test application further comprises:
   selecting to perform a local speed test on the identified at least one wireless client device;
   selecting to perform a WAN speed test using the identified at least one wireless client device; or
   selecting to perform both the local speed test on the identified at least one wireless client device and the WAN speed test using the identified at least one wireless client device.

* * * * *